(12) United States Patent
Solki et al.

(10) Patent No.: US 10,467,178 B2
(45) Date of Patent: Nov. 5, 2019

(54) PERIPHERAL COMPONENT

(71) Applicants: ADVANCED MICRO DEVICES, INC., Sunnyvale, CA (US); ATI TECHNOLOGIES ULC, Markham (CA)

(72) Inventors: Shahin Solki, Richmond Hill (CA); Stephen Morein, San Jose, CA (US); Mark S. Grossman, Palo Alto, CA (US)

(73) Assignees: ADVANCED MICRO DEVICES, INC., Santa Clara, CA (US); ATI TECHNOLOGIES ULC., Markham, Ontario (CA)

( * ) Notice: Subject to any disclaimer, the term of this patent is extended or adjusted under 35 U.S.C. 154(b) by 0 days.

(21) Appl. No.: 15/374,739

(22) Filed: Dec. 9, 2016

(65) Prior Publication Data
US 2017/0235700 A1    Aug. 17, 2017

Related U.S. Application Data

(63) Continuation of application No. 13/764,775, filed on Feb. 11, 2013, now abandoned, which is a continuation of application No. 12/340,510, filed on Dec. 19, 2008, now Pat. No. 8,373,709, which is a continuation-in-part of application No. 12/245,686, filed on Oct. 3, 2008, now Pat. No. 8,892,804.

(51) Int. Cl.
| | |
|---|---|
| G06F 13/42 | (2006.01) |
| G06F 3/14 | (2006.01) |
| G09G 5/36 | (2006.01) |
| G06T 1/20 | (2006.01) |
| G06T 1/60 | (2006.01) |
| G09G 5/00 | (2006.01) |

(52) U.S. Cl.
CPC ............ *G06F 13/4282* (2013.01); *G06F 3/14* (2013.01); *G06T 1/20* (2013.01); *G06T 1/60* (2013.01); *G09G 5/363* (2013.01); *G06F 2213/0026* (2013.01); *G09G 5/006* (2013.01); *G09G 2330/021* (2013.01); *G09G 2360/06* (2013.01)

(58) Field of Classification Search
CPC ............. G06F 13/4022; G06F 13/1642; G06F 13/4027; G06F 13/4221; G06F 3/061; G06F 2213/0026
USPC .................................... 710/33, 313; 345/522
See application file for complete search history.

(56) References Cited

U.S. PATENT DOCUMENTS

| | | | | |
|---|---|---|---|---|
| 7,062,594 B1 * | 6/2006 | Sardella | ............... | G06F 13/4027 710/300 |
| 7,383,412 B1 * | 6/2008 | Diard | ........................ | G06F 9/52 711/170 |
| 7,412,554 B2 * | 8/2008 | Danilak | ..................... | G06T 1/20 710/305 |
| 7,451,259 B2 | 11/2008 | Duncan | | |
| 7,525,548 B2 * | 4/2009 | Azar | ......................... | G06F 3/14 345/502 |

(Continued)

*Primary Examiner* — Faisal M Zaman
(74) *Attorney, Agent, or Firm* — Volpe and Koenig, P.C.

(57) ABSTRACT

Embodiments of a peripheral component are described herein. Embodiments provide alternatives to the use of an external bridge integrated circuit (IC) architecture. For example, an embodiment multiplexes a peripheral bus such that multiple processors in one peripheral component can use one peripheral interface slot without requiring an external bridge IC. Embodiments are usable with known bus protocols.

18 Claims, 5 Drawing Sheets

(56) References Cited

U.S. PATENT DOCUMENTS

| | | | |
|---|---|---|---|
| 7,545,380 B1 | 6/2009 | Diard | |
| 7,616,206 B1* | 11/2009 | Danilak | G06F 15/16 345/505 |
| 7,616,207 B1* | 11/2009 | Diard | G06T 1/20 345/502 |
| 7,619,629 B1* | 11/2009 | Danilak | G06F 15/167 345/502 |
| 7,721,118 B1* | 5/2010 | Tamasi | G06F 1/3203 713/300 |
| 7,782,325 B2* | 8/2010 | Gonzalez | G06F 3/1438 345/505 |
| 7,989,546 B2 | 3/2011 | Eitzmann | |
| 8,054,314 B2* | 11/2011 | Kelley | G06F 9/30069 345/502 |
| 8,066,515 B2* | 11/2011 | Johnson | G06F 1/184 439/61 |
| 8,130,227 B2 | 3/2012 | Johnson | |
| 8,161,209 B2* | 4/2012 | Morein | G06F 13/4265 340/2.1 |
| 8,294,731 B2 | 10/2012 | Tuomi | |
| 8,373,709 B2* | 2/2013 | Solki | G06F 3/14 345/501 |
| 8,892,804 B2* | 11/2014 | Morein | G06F 13/4031 345/502 |
| 2005/0237327 A1* | 10/2005 | Rubinstein | G06F 3/14 345/519 |
| 2006/0267990 A1* | 11/2006 | Rogers | G06T 1/20 345/502 |
| 2006/0267993 A1* | 11/2006 | Hunkins | G06F 3/14 345/502 |
| 2006/0277347 A1* | 12/2006 | Ashmore | G06F 3/0611 710/313 |
| 2006/0282604 A1* | 12/2006 | Temkine | G09G 5/363 710/314 |
| 2007/0139422 A1* | 6/2007 | Kong | G09G 5/363 345/502 |
| 2010/0026691 A1* | 2/2010 | Yan | G06T 1/20 345/502 |
| 2011/0238938 A1* | 9/2011 | Kloeppner | G06F 3/0611 711/162 |

* cited by examiner

PERIPHERAL COMPONENT

CROSS REFERENCE TO RELATED APPLICATIONS

This application is a continuation of U.S. patent application Ser. No. 13/764,775, filed Feb. 11, 2013, which is a continuation of U.S. patent application Ser. No. 12/340,510, filed Dec. 19, 2008, which is a Continuation-in-Part of U.S. patent application Ser. No. 12/245,686, filed Oct. 3, 2008, which are incorporated by reference as if fully set forth.

FIELD OF THE INVENTION

The invention is in the field of data transfer in computer and other digital systems.

BACKGROUND

Figure 1:
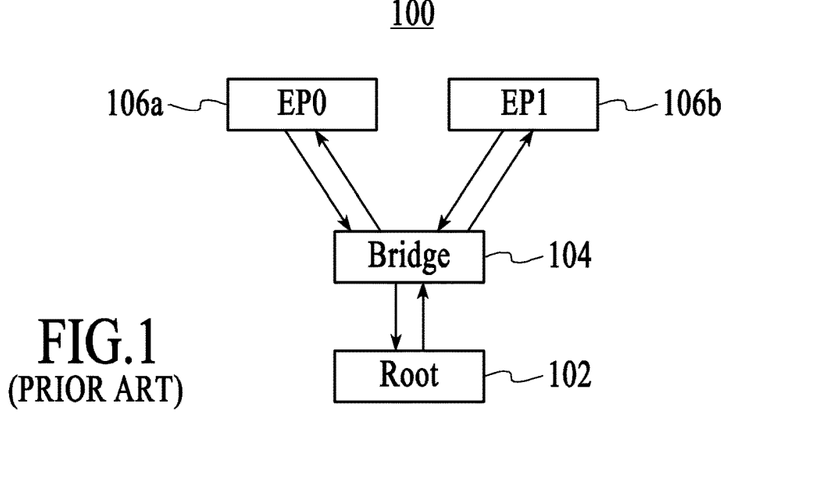
FIG. 1 is a block diagram of a prior art processing system with peripheral components.

As computer and other digital systems become more complex and more capable, methods and hardware to enhance the transfer of data between system components or elements continually evolve. Data to be transferred include signals representing data, commands, or any other signals. Speed and efficiency of data transfer is particularly critical in systems that run very data-intensive applications, such as graphics applications. In typical systems, graphics processing capability is provided as a part of the central processing unit (CPU) capability, or provided by a separate special purpose processor such as a graphics processing unit (GPU) that communicates with the CPU and assists in processing graphics data for applications such as video games, etc. One or more GPUs may be included in a system. In conventional multi-GPU systems, a bridged host interface (for example a PCI express (PCIe®) bus) interface must share bandwidth between peer to peer traffic and host traffic. Traffic consists primarily of memory data transfers but may often include commands. FIG. 1 is a block diagram of a prior art system 100 that includes a root 102. A typical root 102 is a computer chipset, including a central processing unit (CPU), a host bridge 104, and two endpoints EP0 106a and EP1 106b. Endpoints are bus endpoints and can be various peripheral components, for example special purpose processors such as graphics processing units (GPUs). The root 102 is coupled to the bridge 104 by one or more buses to communicate with peripheral components. Some peripheral component endpoints (such as GPUs) require a relatively large amount of bandwidth on the bus because of the large amount of data involved in their functions. It would be desirable to provide an architecture that reduced the number of components and yet provided efficient data transfer between components. For example, the cost of bridge integrated circuits (ICs) is relatively high. In addition, the size of a typical bridge IC is comparable to the size of a graphics processing unit (GPU) which requires additional printed circuit board area and could add to layer counts. Bridge ICs also require additional surrounding components for power, straps, clock and possibly read only memory (ROM).

DETAILED DESCRIPTION

Embodiments of a multi-processor architecture and method are described herein. Embodiments provide alternatives to the use of an external bridge integrated circuit (IC) architecture. For example, an embodiment multiplexes a peripheral bus such that multiple processors can use one peripheral interface slot without requiring an external bridge IC. Other embodiments include a system with multiple bus endpoints coupled to a bus root via a host bus bridge that is internal to at least one bus endpoint. In addition, the bus endpoints are directly coupled to each other. Embodiments are usable with known bus protocols.

Figure 2:
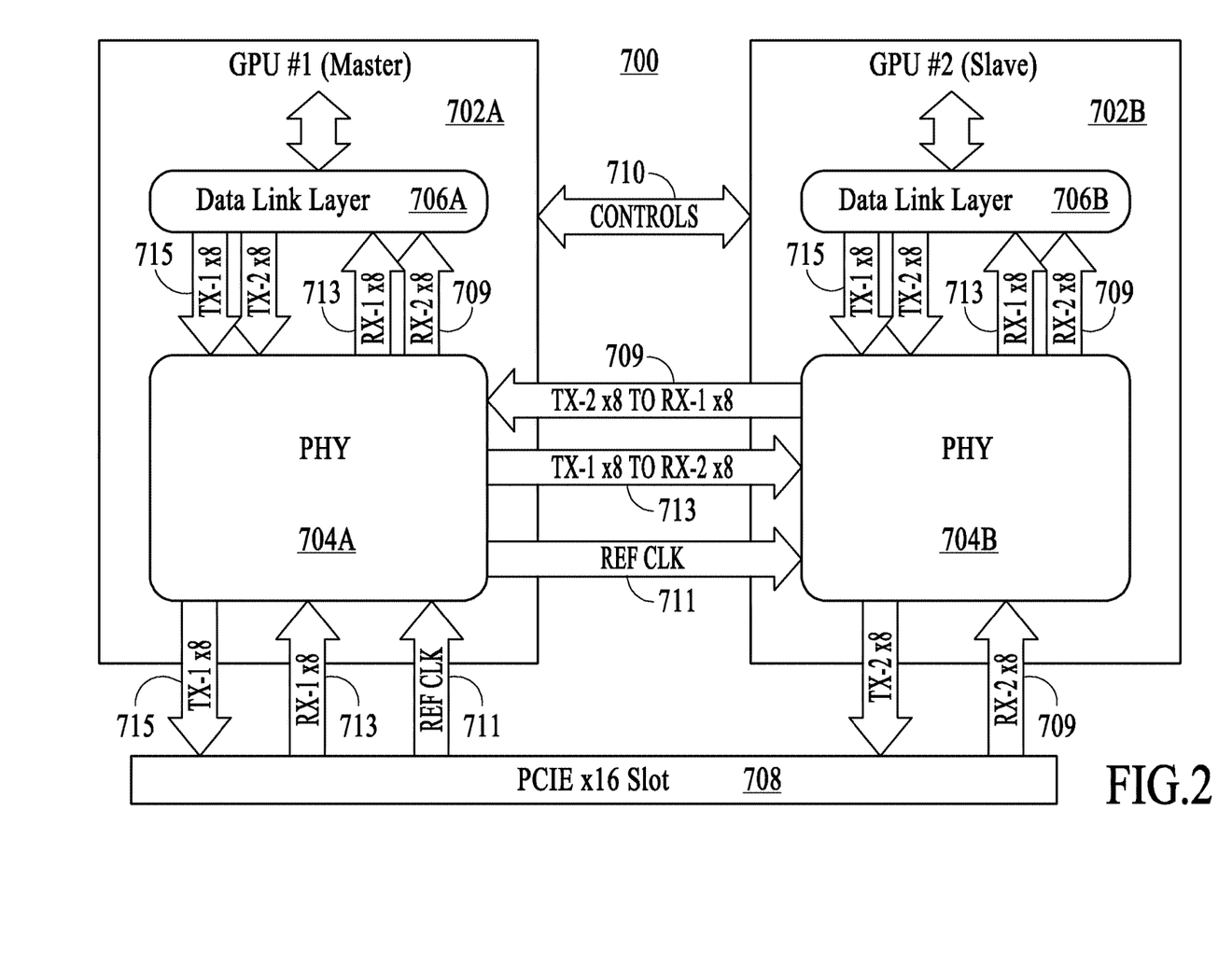
FIG. 2 is a block diagram of portions of a multi-processor system with a multiplexed peripheral component bus, according to an embodiment.

FIG. 2 is a block diagram of portions of a multi-processor system 700 with a multiplexed peripheral component bus, according to an embodiment. In this example system, there are two GPUs, a master GPU 702A and a slave GPU 702B. Each GPU 702 has 16 peripheral component interconnect express (PCIe®)) transmit (TX) lanes and 16 PCIe® receive (RX) lanes. Each of GPUs 702 includes a respective data link layer 706 and a respective physical layer (PHY) 704. Eight of the TX/RX lanes of GPU 702A are connected to half of TX/RX lanes of a X16 PCIe® connector, or slot 708. Eight of the TX/RX lanes of GPU 702B are connected to the remaining TX/RX lanes of the X16 PCIe® connector or slot 708. The remaining TX/RX lanes of each of GPU 702A and GPU 702B are connected to each other, providing a direct, high-speed connection between the GPUs 702.

The PCIe® 16 slot 708 (which normally goes to one GPU) is split into two parts. Half of the slot is connected to GPU 702A and the other half is connected to GPU 702B. Each GPU 702 basically echoes back the other half of the data to the other GPU 702. That is, data received by either GPU is forwarded to the other. Each GPU 702 sees the all of the data received by the PCIe® bus, and internally each GPU 702 decides whether it is supposed to answer the request or comments. Each GPU 702 then appropriately responds, or does nothing. Some data or commands, such as "Reset" are applicable to all of the GPUs 702.

From the system level point of view, or from the view of the peripheral bus, there is only one PCIe® load (device) on the PCI® bus. Either GPU 702A or GPU 702B is accessed based on address. For example, for Address Domain Access, master GPU 702A can be assigned to one half of the address domain and slave GPU 702B can assigned to the other half. The system can operate in a Master/Slave mode or in a Single/Multi GPU modes, and the modes can be identified by straps.

Various data paths are identified by reference numbers. A reference clock (REF CLK) path is indicated by 711. An 8-lane RX-2 path is indicated by 709. An 8-lane RX-1 path is indicated by 713. An 8-lane TX-1 path is indicated by 715.

Control signals 710 are non-PCIe® signals such as straps. The (PHY) 704 in each GPU 702 echoes the data to the proper lane or channel. Lane connection can be done in the order, which helps to optimize silicon design and/or to support PCIe® slots with less than 16 lanes. Two GPUs are shown as an example of a system, but the architecture is scalable to n-GPUs. In addition, GPUs 702 are one example of a peripheral component that can be coupled as described. Any other peripheral components that normally communicate with a peripheral component bus in a system could be similarly coupled.

Figure 3:
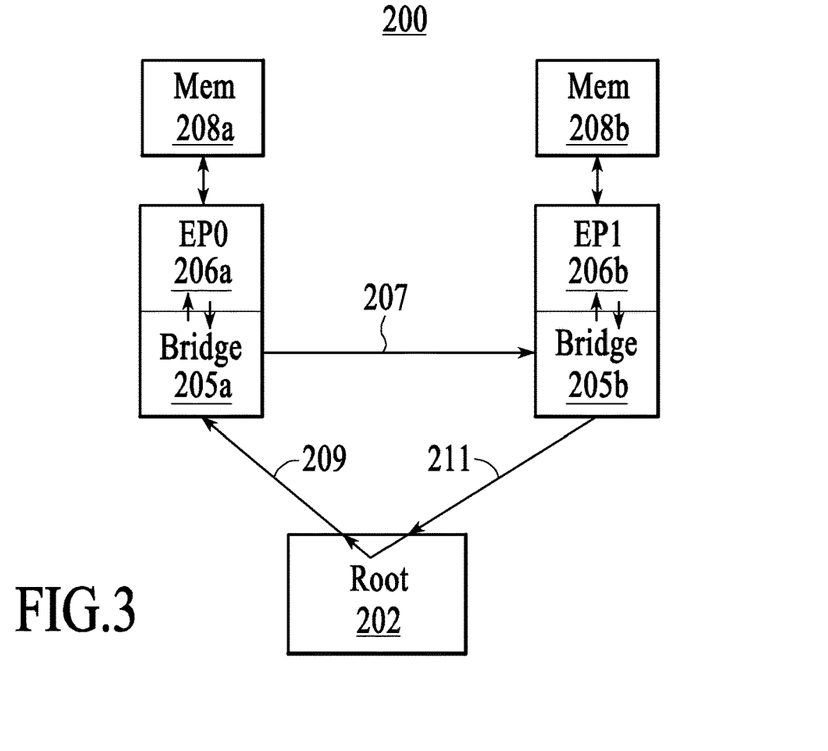
FIG. 3 is a block diagram of portions of a processing system with peripheral components, according to an embodiment.

FIG. 3 is a block diagram of portions of a processing system 200 with peripheral components, according to an embodiment. System 200 includes a bus root 202 that is similar to the bus root 102 of FIG. 1. The bus root 202 in an embodiment is a chipset including a CPU and system memory. The root 202 is coupled via a bus 209 to an endpoint EP0 206a that includes an internal bridge 205a. The bus 209 in an embodiment is a PCI express (PCIe®) bus, but embodiments are not so limited. EP0 206a is coupled to another endpoint EP1 206b. EP1 206b includes an internal bridge 205b. EP0 205a and EP 205B are through their respective bridges via a bus 207. EP1 206b is coupled through its bridge 205b to the root 202 via a bus 211. Each of endpoints EP0 206a and EP1 206b includes respective local memories 208a and 208b. From the perspective of the root 202, 209 and 211 make up transmit and receive lanes respectively of a standard bidirectional point to point data link.

In an embodiment, EP0 206a and EP1 206b are identical. As further explained below, in various embodiments, bridge 205b is not necessary, but is included for the purpose of having one version of an endpoint, such as one version of a GPU, rather than manufacturing two different versions. Note that EP0 may be used standalone by directly connecting it to root 202 via buses 209 and 207; similarly EP1 may be used standalone by directly connecting it to root 202 via buses 207 and 211.

The inclusion of a bridge 205 eliminates the need for an external bridge such as bridge 104 of FIG. 1 when both EP0 and EP1 are present. In contrast to the "Y" or "T" formation of FIG. 1, system 200 moves data in a loop (in this case in a clockwise direction). The left endpoint EP0 can send data directly to the right endpoint EP1. The return path from EP1 to EP0 is through the root 202. As such, the root has the ability to reflect a packet of data coming in from EP1 back out to EP0. In other words, the architecture provides the appearance of a peer-to-peer transaction on the same pair of wires as is used for endpoint to root transactions.

EP0 206a and EP1 206b are also configurable to operate in the traditional configuration. That is, EP0 206a and EP1 206b are each configurable to communicate directly with the root 202 via buses 209 and 211, which are each bidirectional in such a configuration.

Figure 4:
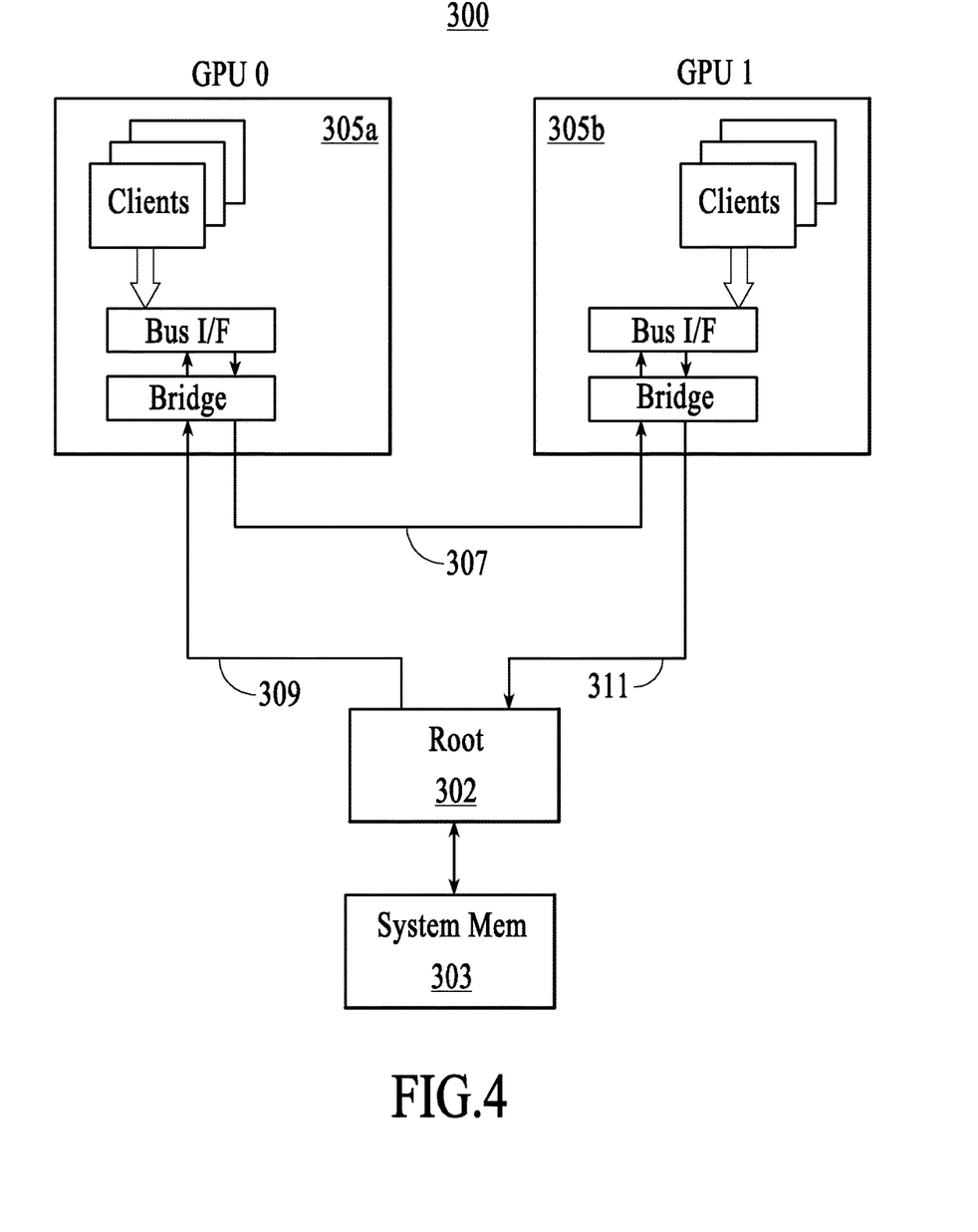
FIG. 4 is a more detailed block diagram of a processing system with peripheral components, according to an embodiment.

FIG. 4 is a more detailed block diagram of a processing system with peripheral components, according to an embodiment. System 300 is similar to system 200, but additional details are shown. System 300 includes a bus root 302 coupled to a system memory 303. The bus root 302 is further coupled to an endpoint 305a via a bus 309. For purposes of illustrating a particular embodiment, endpoints 305a and 305b are GPUs, but embodiments are not so limited. GPU0 305a includes multiple clients. Clients include logic, such as shader units and decoder units, for performing tasks. The clients are coupled to an internal bridge through bus interface (I/F) logic, which control all of the read operations and write operations performed by the GPU.

GPU0 305a is coupled to a GPU1 305b via a bus 307 from the internal bridge of GPU0 305a to the internal bridge of GPU1 305b. In an embodiment, GPU1 305b is identical to GPU0 305a and includes multiple clients, an internal bridge and I/F logic. Each GPU typically connects to a dedicated local memory unit often implemented as GDDR DRAM. GPU 305b is coupled to the bus root 302 via a bus 311. In one embodiment, as the arrows indicate, data and other messages such as read requests and completions flow in a clockwise loop from the bus root 302 to GPU0 305a to GPU1 305b.

In other embodiments, one of the GPUs 305 does not include a bridge. In yet other embodiments, data flows counterclockwise rather than clockwise.

In one embodiment, the protocol that determines data routing is communicated with in such as ways as to make the architecture appears the same as the architecture of FIG. 1. In particular, the bridge in 305b must appear on link 307 to bridge 305a as an upstream port, whereas the corresponding attach point on the bridge in 305a must appear on link 309 to root 302 as a downstream port. Furthermore, the embedded bridge must be able to see its outgoing link as a return path for all requests it receives on its incoming link, even though the physical routing of the two links is different. This is achieved by setting the state of a Chain Mode configuration strap for each GPU. If the strap is set to zero, the bridge assumes both transmit and receive links are to an upstream port, either a root complex or a bridge device. If the strap is set to one, the bridge assumes a daisy-chain configuration.

In another embodiment, the peer to peer bridging function of the root is a two-step process according to which GPU 305b writes data to the system memory 303, or buffer. Then as a separate operation GPU0 305a reads the data back via the bus root 302.

The bus root 302 responds to requests normally, as if the internal bridge were an external bridge (as in FIG. 1). In an embodiment, the bridge of GPU0 305a is configured to be active, while the bridge of GPU1 305b is configured to appear as a wire, and simply pass data through. This allows the bus root 302 to see buses 309 and 311 as a normal peripheral interconnect bus. When the bus root reads from the bridge of GPU0 305a, this bridge sends the data to pass through the bridge of GPU1 305b and return to the bus root 302 as if the data came directly from GPU0 305a.

Figure 5:
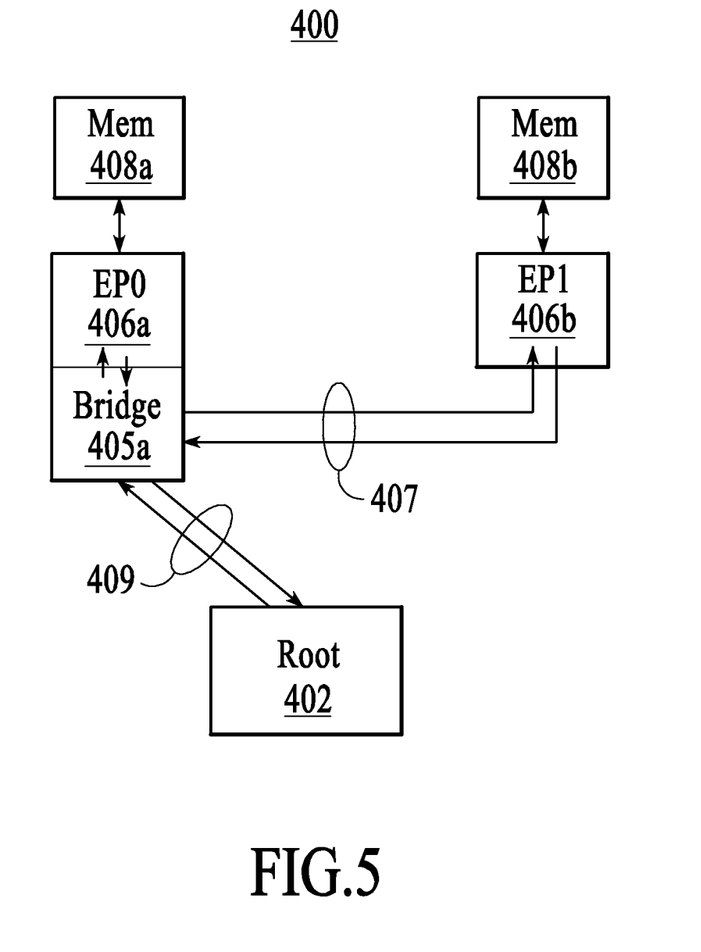
FIG. 5 is a block diagram of an embodiment in which one bus endpoint includes an internal bridge.

FIG. 5 is a block diagram of a system 400 in which one of the multiple bus endpoints includes an internal bridge. System 400 includes a bus root 402, and an EP0 406a that includes a bridge 405a. EP0 406a is coupled to the root 402 through the bridge 405a via a bus 409, and also to EP1b406b through the bridge 405a via a bus 407. Each of endpoints EP0 406a and EP 406b includes respective local memories 408a and 408b.

Figure 6:
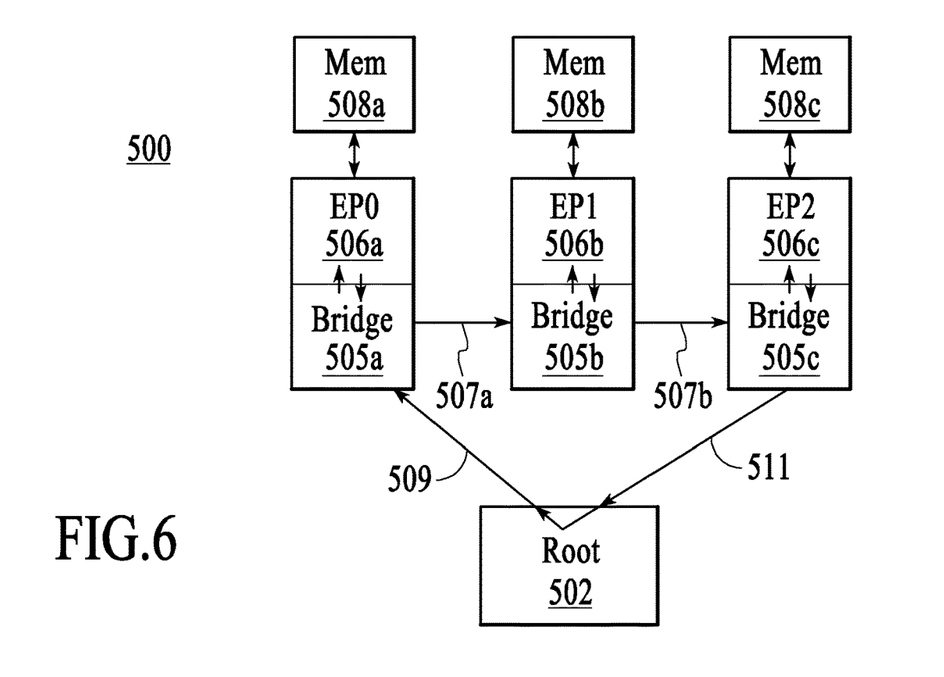
FIG. 6 is a block diagram of an embodiment that includes more than two bus endpoints, each including an internal bridge.

FIG. 6 is a block diagram of a system 500 including more than two bus endpoints, each including an internal bridge. System 500 includes a bus root 502, and an EP0 506a that includes a bridge 505a and a local memory 508a. System 500 further includes an EP1 506b that includes a bridge 505b and a local memory 508b, and an EP1 506c that includes a bridge 505c and an internal memory 508c.

EP0 506a is coupled to the root 502 through the bridge 505a via a bus 509, and also to EP1b 506b through the bridge 506b via a bus 507a. EP0 506b is coupled to EP1c 506c through the bridge 506c via a bus 507b. Other embodiments include additional endpoints that are added into the ring configuration. In other embodiments, the system includes more than two endpoints 506, but the rightmost endpoint does not include an internal bridge. In yet other embodiments the flow of data is counterclockwise as opposed clockwise, as shown in the figures.

Referring again to FIG. 4, there are two logical ports on the internal bridge according to an embodiment. One port is "on" in the bridge of GPU0 305a, and one port is "off" in the bridge of GPU1 305b. The bus root 302 may perform write operations by sending requests on bus 309. A standard addressing scheme indicates to the bridge to send the request to the bus I/F. If the request is for GPU1 305b, the bridge routes the request to bus 307. So in an embodiment, the respective internal bridges of GPU0 305a and GPU1 305b are programmed differently.

Figure 7:
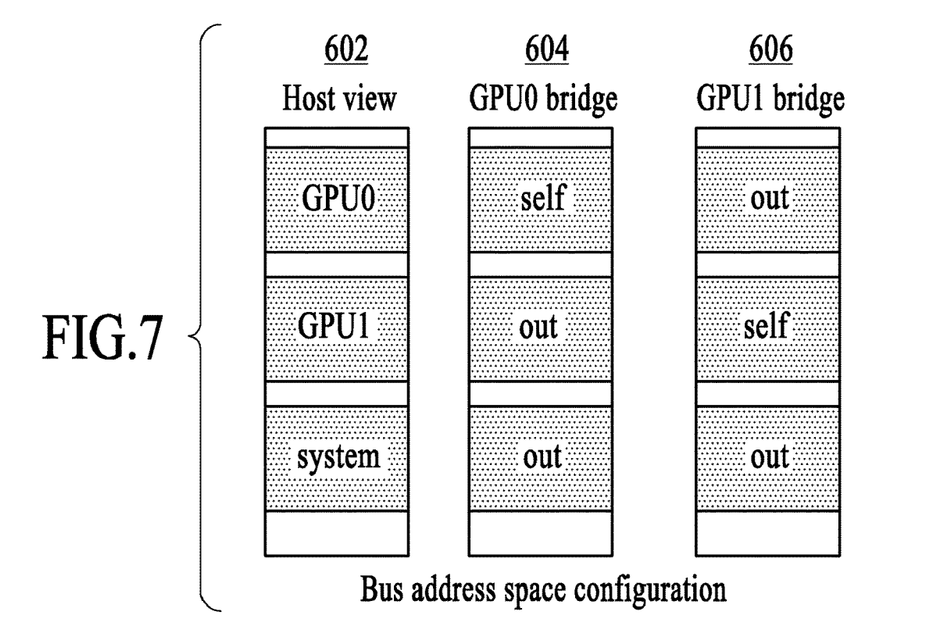
FIG. 7 is a block diagram illustrating views of memory space from the perspectives of various components in a system, according to an embodiment.

FIG. 7 is a block diagram illustrating the division of bus address ranges and the view of memory space from the perspective of various components. With reference also to FIG. 4, 602 is a view of memory from the perspective of the bus root, or Host processor 302. 604 is a view of memory from the perspective of the GPU0 305a internal bridge. 606 is a view of memory from the perspective of the GPU1 305b internal bridge. The bus address range is divided into ranges for GPU0 305a, GPU1 305b, and system 302 memory spaces. The GPU0 305a bridge is set up so that incoming requests to the GPU0 305a range are routed to its own local memory. Incoming requests from the root or from GPU0 305a itself to GPU1 305b or system 302 ranges are routed to the output port of GPU0 305a. The GPU1 305b bridge is set up slightly differently so that incoming requests to the GPU 305b range are routed to its own local memory. Requests from GPU0 305a or from GPU1 305b itself to root or GPU0 305a ranges are routed to the output port of GPU1 305b.

The host sees the bus topology as being like the topology of FIG. 1. GPU1 305b can make its own request to the host processor 302 through its own bridge and it will pass through to the host processor 302. When the host processor 302 is returning a request, it goes through the bridge of GPU0 305a, which has logic for determining where requests and data are to be routed.

Write operations from GPU1 305b to GPU0 305a can be performed in two passes. GPU1 305b sends data to a memory location in the system memory 303. Then separately, GPU0 305a reads the data after it learns that the data is in the system memory 303.

Completion messages for read data requests and other split-transaction operations must travel along the wires in the same direction as the requests. Therefore in addition to the address-based request routing described above, device-based routing must be set up in a similar manner. For example, the internal bridge of GPU0 305a recognizes that the path for both requests and completion messages is via bus 307.

An embodiment includes power management to improve power usage in lightly loaded usage cases. For example in a usage case with little graphics processing, the logic of GPU1 305b is powered off and the bridging function in GPU1 305b is reduced to a simple passthrough function from input port to output port. Furthermore, the function of GPU0 305a is reduced to not process transfers routed from the input port to the output port. In an embodiment, there is a separate power supply for the bridging function in GPU1 305b. Software detects the conditions under which to power down. Embodiments include a separate power regulator and/or separate internal power sources for bridges that are to be powered down separately from the rest of the logic on the device.

Even in embodiments that do not include the power management described above, system board area is conserved because an external bridge (as in FIG. 1) is not required. The board area and power required for the external bridge and its pins are conserved. On the other hand, it is not required that each of the GPUs have its own internal bridge. In another embodiment, GPU1 305b does not have an internal bridge, as described with reference to FIG. 5.

The architecture of system 300 is practical in a system that includes multiple slots for add-in circuit boards. Alternatively, system 300 is a soldered system, such as on a mobile device.

Buses 307, 309 and 311 can be PCIe® buses or any other similar peripheral interconnect bus.

Any circuits described herein could be implemented through the control of manufacturing processes and maskworks which would be then used to manufacture the relevant circuitry. Such manufacturing process control and mask-work generation are known to those of ordinary skill in the art and include the storage of computer instructions on computer readable media including, for example, Verilog, VHDL or instructions in other hardware description languages.

Aspects of the embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices, and standard cell-based devices, as well as application specific integrated circuits (ASICs) and fully custom integrated circuits. Some other possibilities for implementing aspects of the embodiments include microcontrollers with memory (such as electronically erasable programmable read only memory (EEPROM), Flash memory, etc.), embedded microprocessors, firmware, software, etc. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

The term "processor" as used in the specification and claims includes a processor core or a portion of a processor. Further, although one or more GPUs and one or more CPUs are usually referred to separately herein, in embodiments both a GPU and a CPU are included in a single integrated circuit package or on a single monolithic die. Therefore a single device performs the claimed method in such embodiments.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word, any of the items in the list, all of the items in the list, and any combination of the items in the list.

The above description of illustrated embodiments of the method and system is not intended to be exhaustive or to limit the invention to the precise forms disclosed. While specific embodiments of, and examples for, the method and system are described herein for illustrative purposes, various equivalent modifications are possible within the scope of the invention, as those skilled in the relevant art will recognize. The teachings of the disclosure provided herein can be applied to other systems, not only for systems including graphics processing or video processing, as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a DVR or PVR, a handheld device, a mobile telephone or some other device. The elements and acts of the various embodiments described above can be combined to provide further embodiments. These and other changes can be made to the method and system in light of the above detailed description.

In general, in the following claims, the terms used should not be construed to limit the method and system to the specific embodiments disclosed in the specification and the claims, but should be construed to include any processing systems and methods that operate under the claims. Accordingly, the method and system is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the method and system may be recited as embodied in computer-readable medium, other aspects may likewise be embodied in computer-readable medium. Such computer readable media may store instructions that are to be executed by a computing device (e.g., personal computer, personal digital assistant, PVR, mobile device or the like) or may be instructions (such as, for example, Verilog or a hardware description language) that when executed are designed to create a device (GPU, ASIC, or the like) or software application that when operated performs aspects described above. The claimed invention may be embodied in computer code (e.g., HDL, Verilog, etc.) that is created, stored, synthesized, and used to generate GDSII data (or its equivalent). An ASIC may then be manufactured based on this data.

Accordingly, the inventors reserve the right to add additional claims after filing the application to pursue such additional claim forms for other aspects of the method and system.

What is claimed is:

1. A peripheral component system comprising:
a bus;
a first peripheral component; and
a second peripheral component,
wherein the first peripheral component is coupled directly to the bus via a first bus interface comprising a first portion of a peripheral component interface express ("PCIe") slot, the first bus interface including a first plurality of communication lanes and coupled to the second peripheral component via a first peripheral interface that includes a second plurality of communication lanes that comprise PCIe lanes;
wherein the second peripheral component is coupled directly to the bus via a second bus interface comprising a second portion of the PCIe slot, the second bus interface including a third plurality of communication lanes and coupled to the first peripheral component via a second peripheral interface that includes a fourth plurality of communication lanes that comprise PCIe lanes,
wherein the first peripheral component is configured to forward data received from the bus via the first plurality of communication lanes of the PCIe slot to the second peripheral via the first peripheral interface and the second peripheral component is configured to forward data received from the bus via the second plurality of communication lanes of the PCIe slot to the first peripheral component via the second peripheral interface.

2. The peripheral component system of claim 1, wherein:
the first peripheral component is configured to determine whether the first peripheral component is to respond to the data received from the bus and to respond or not accordingly; and
the second peripheral component is configured to determine whether the second peripheral component is to respond to the data received from the bus and to respond or not accordingly.

3. The peripheral component system of claim 2, wherein:
both of the first peripheral component and the second peripheral component are configured to respond to certain commands received via the bus.

4. The peripheral component system of claim 3, wherein:
the certain commands include a reset command.

5. The peripheral component system of claim 1, wherein:
the first peripheral component and second component appear on the bus as a single apparent peripheral component.

6. The peripheral component system of claim 1, wherein:
accesses made over the bus are directed to either the first peripheral component or second peripheral component is based on address.

7. The peripheral component system of claim 1, wherein:
the first plurality of communication lanes and the second plurality of communication lanes are peripheral component interconnect express (PCIe) lanes.

8. The peripheral component system of claim 7, further comprising:
a single shared 16 lane PCIe slot that couples the bus to both the first peripheral component and the second peripheral component.

9. A method comprising:
receiving first data via a first bus interface coupled directly to a bus, at a first peripheral component coupled directly to the bus via the first bus interface that includes a first plurality of communication lanes and is coupled to the second peripheral component via a first peripheral interface that includes a second plurality of communication lanes, wherein the first bus interface comprises a first portion of a peripheral component interface express ("PCIe") slot and the second plurality of communication lanes comprise PCIe lanes;

receiving second data via a second bus interface coupled directly to the bus, at the second peripheral component that is coupled directly to the bus via a second bus interface that includes a third plurality of communication lanes and is coupled to the first peripheral component via a second peripheral interface that includes a fourth plurality of communication lanes, wherein the second bus interface comprises a second portion of the PCIe slot and the fourth plurality of communication lanes comprises PCIe lanes;

forwarding the first data to the second peripheral component via the first peripheral interface, wherein the first data is received from the bus via the first plurality of communication lanes of the PCIe slot; and forwarding the second data to the first peripheral component via the second peripheral interface, wherein the first data is received from the bus via the second plurality of communication lanes of the PCIe slot.

10. The method of claim 9, wherein:

determining, by the first peripheral component, whether the first peripheral component is to respond to the data received from the bus and responding or not accordingly; and determining, by the second peripheral component, whether the second peripheral component is to respond to the data received from the bus and responding or not accordingly.

11. The method of claim 10, wherein:

responding, by both the first peripheral component and the second peripheral component, to certain commands received via the bus.

12. The method of claim 11, wherein:

the certain commands include a reset command.

13. The method of claim 9, wherein:

the first peripheral component and second component appear on the bus as a single apparent peripheral component.

14. The method of claim 9, wherein:

accesses made over the bus are directed to either the first peripheral component or second peripheral component is based on address.

15. The method of claim 9, wherein:

the first plurality of communication lanes and the second plurality of communication lanes are peripheral component interconnect express (PCIe) lanes.

16. The method of claim 15, wherein:

data transmitted via the bus is transmitted to the first peripheral component and the second peripheral component via a single shader 16 lane PCIe slot that couples the bus to both the first peripheral component and the second peripheral component.

17. The method of claim 16, wherein:

each of the first plurality of communication lanes and the second plurality of communication lanes include eight PCIe slots;

a first eight lanes of the first plurality of communication lanes are coupled to the 16 lane PCIe slot;

a second eight lanes of the first plurality of communication lanes are coupled to the second peripheral component;

a first eight lanes of the second plurality of communication lanes are coupled to the 16 lane PCIe slot; and a second eight lanes of the second plurality of communication lanes are coupled to the first peripheral component.

18. The peripheral component system of claim 1, wherein:

the first peripheral component and the second peripheral component are both graphics processing units.

\* \* \* \* \*